United States Patent

[11] 3,587,999

| [72] | Inventors | Wladimir Miniovitch<br>Le Cannet;<br>Claude Chenin, Cannes La Bocca, France |
|---|---|---|
| [21] | Appl. No. | 715,421 |
| [22] | Filed | Mar. 22, 1968 |
| [45] | Patented | June 28, 1971 |
| [73] | Assignee | Sud-Aviation Societe Nationale de<br>Constructions Aeronautiques<br>Paris, France |
| [32] | Priority | Mar. 31, 1967 |
| [33] | | France |
| [31] | | 100,949 |

[54] ARTICULATION DEVICE FOR DEPLOYABLE
APPURTENANCES ON SPACECRAFT
8 Claims, 16 Drawing Figs.
[52] U.S. Cl....................................................... 244/1,
74/2, 185/37, 244/138
[51] Int. Cl....................................................... B64g 1/00

[50] Field of Search............................................. 185/37
(Inquired); 74/2 (Inquired); 244/1 (SS), 138.1

[56] References Cited
UNITED STATES PATENTS
| 3,017,147 | 1/1962 | Robinson, Jr. et al. ........ | 244/138.1 |
| 3,105,658 | 10/1963 | Marshall et al. ............... | 244/1SS |
| 3,175,619 | 3/1965 | Reed, Jr. ........................ | 244/183.1X |

Primary Examiner—Duane A. Reger
Assistant Examiner—Jeffrey L. Forman
Attorney—Waters, Roditi, Schwartz & Nissen ABSTRACT: An articulation device is provided for enabling appurtenances associated with a spacecraft such as an artificial satellite to be deployed and which comprises powered deploying and retracting means and damping means of the deployment motion, the powered and damping means being housed in an enclosure mounted directly on an articulation support and within which pivots a rotation shaft associated with the corresponding appurtenance.

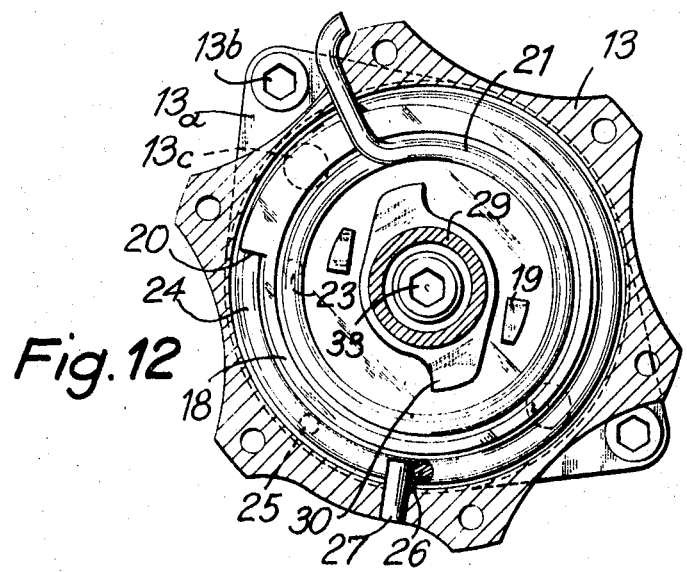
Fig. 12
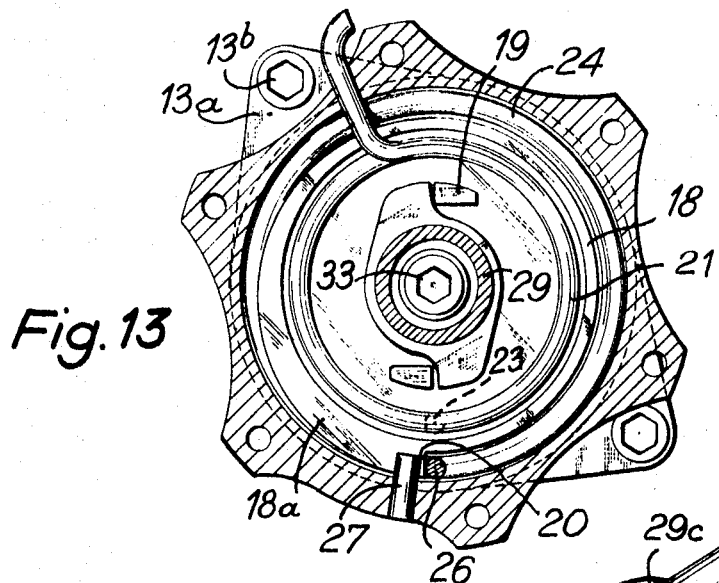
Fig. 13
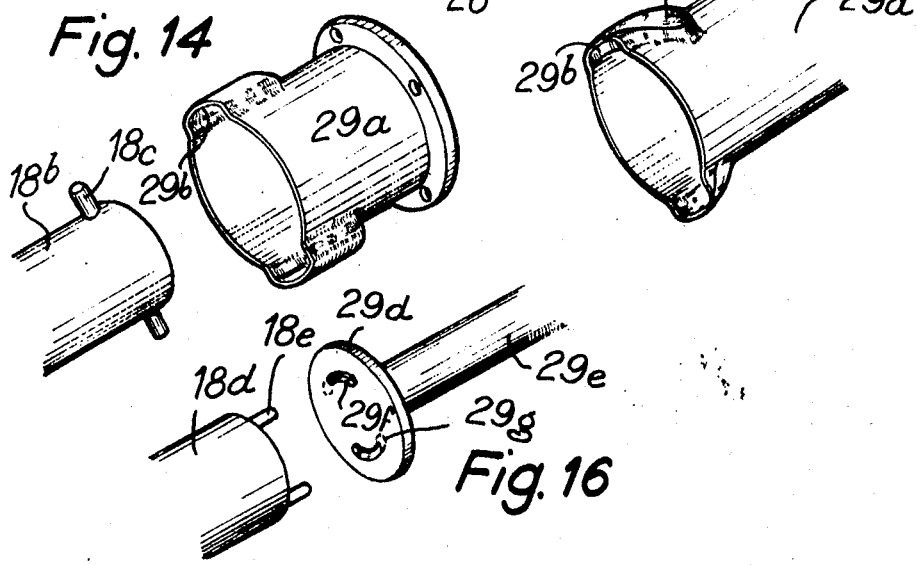
Fig. 14
Fig. 15
Fig. 16

ARTICULATION DEVICE FOR DEPLOYABLE APPURTENANCES ON SPACECRAFT

BRIEF SUMMARY OF THE INVENTION

A variety of devices have already been designed and built for permitting deployment in flight of appurtenances associated with spacecraft and notably with satellites, examples being solar panels or scientific instrumentation arms positioned around the body of the spacecraft.

In most cases such devices are required to perform the following functions:

an actuating function, since the spacecraft is not always possessed of spinning motion;

a damping function, to avoid the onset at the end of deployment of excessive stresses in the structure supporting the articulation device;

a positioning function, called for by the very functions which the panels or other appurtenances are required to fulfill; and the function of equalizing the rates of opening of the different appurtenances, in order to prevent stability impairing asymmetrical forces from being engendered during rotation of the spacecraft.

The carrying out of these functions is often closely linked to such strict requirements as:

minimum size and weight;

the exclusion of nonmetallic materials which de-gas in space;

the exclusion of magnetic materials;

extreme accuracy in positioning the deployed appurtenances; and great reliability.

Further, such systems must be capable of ensuring extension of the spacecraft elements under greatly varying conditions such as:

inertia forces due to a rotating motion that are superimposed upon the actuating function and call upon the damping function to operate over a very wide energy band;

a more or less high vacuum; and the absence of gravity.

It is the principal aim of the present invention to provide means of satisfying the above-mentioned functions and the requirements bound up therewith.

This invention accordingly relates to an articulation device for permitting the deployment of spacecraft or artificial satellite appurtenances in which an actuating/damping device is contained in a generally cylindrical compact housing which is directly adaptable onto an articulation support and within which pivots a rotation shaft associated with the appurtenance to be deployed. Likewise contained in this housing are two prestressed, oppositely acting coaxial coil springs, of which one provides the actuating moment for deploying the appurtenance and the other the restoring moment subsequent to damping of the deploying movement. To enable them to perform these functions, said springs are connected across a rotatable member such as the shaft connected to the appurtenance to be deployed and a fixed element such as the housing containing the device.

In accordance with the present invention, the damping means utilize the plastic deformation of a metal, such deformation taking place in response to torsion, stamping or repulsing forces, or to several of these forces at once.

In one specific form of embodiment, the damping means is preferably a tube concentric with the rotation axis of the appurtenance to be deployed and having one of its ends fixed to said housing and the other shaped to enable it to receive a torsional moment when the appurtenance to be deployed has reached the end of its travel.

The material used for the damping means is characterized by its great capacity for elongation, entirely suitable materials for the purpose being red copper, aluminum, lead and like metals.

In this way, a small space suffices for absorbing a considerable quantity of energy.

A catch and latching spring cooperating with an adjustable latching peg, fixed to the outside of the housing, fulfill the deployed appurtenance positioning function.

In a likewise specific constructional form, equalization of the rates of deployment of the appurtenances, which pivot about axes perpendicular to the spacecraft roll axis, is accomplished conventionally by means of toothed bevel sectors.

The two last-mentioned functions, to wit the positioning function and the function of equalizing the rates of deployment of the appurtenances, are especially important in the case of a satellite rotating about its longitudinal or transverse axis, either for stabilizing it or for preserving its stability.

The articulation systems devised as above, adapted for permitting deployment of appurtenances positioned around the body of a satellite, are fixed to the structure thereof and are preferably two in number for any given appurtenance in order to make it easier to effect the deployment of two adjacent appurtenances in concert. In cases where the spacecraft is rotating about its longitudinal or lateral axis, centrifugal force may be superimposed upon the actuating force of the springs used to deploy the appurtenances, the latter being designed to deploy from a folded position substantially parallel to and proximate the spacecraft fore-aft axis into positions radially spaced therefrom.

Initially these appurtenances are restrained in the folded position by a girdling system such as a strap equipped with tensioners and cable-cutters, or with explosive separators.

The process of deployment of the appurtenances is then initiated as soon as the restraining strap has been ruptured.

The description which follows with reference to the accompanying nonlimitative exemplary drawings will give a clear understanding of how the invention can be carried into practice.

BRIEF DESCRIPTION OF THE DRAWING

FIG. 12 is a sectional view of the complete articulation, taken on the line XII—XII of FIG. 9, the positions of the parts portrayed corresponding to those occupied when said parts are in the folded position.

FIG. 13 is an identical sectional view, but in which the parts are in the position they occupy when the panels coact with the damper as they deploy.

FIG. 14 is a diagrammatic perspective view of an alternative embodiment of damper means.

FIG. 15 portrays one of the parts of the damper of FIG. 14 after it has performed its damping function.

FIG. 16 is a corresponding perspective view of an alternative embodiment of a damper.

DETAILED DESCRIPTION

Figure 1:
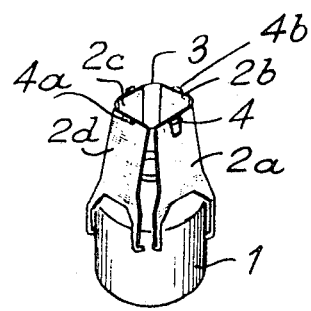
FIG. 1 shows schematically in perspective view a satellite with folded solar panels.

Reference to FIGS. 1 to 4 shows a satellite 1 equipped with four panels 2a, 2b, 2c and 2d capable of being deployed and equipped to that end with articulations for permitting such deployment. In the configuration in which the panels are folded, shown in FIG. 1, a retaining strap 3 is tensed by tensioners 4a and 4b about arcuate elements rigid with the tips of the panels. Two of the four panels comprise cable-cutters 4 of the preferably open-anvil-type or explosive separators for rupturing the strap at the required moment, following which the panel articulations can begin to perform their functions.

Figure 2:
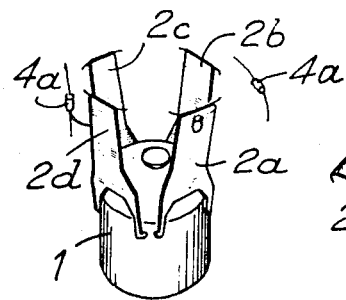
FIG. 2 is a corresponding view showing the start of the panel deployment phase.
Figure 3:
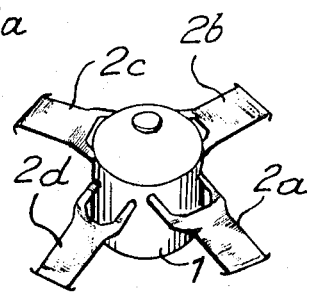
FIG. 3 shows correspondingly the solar panels in the position reached at the end of a deployment, subsequent to completion of the damping phase.
Figure 4:
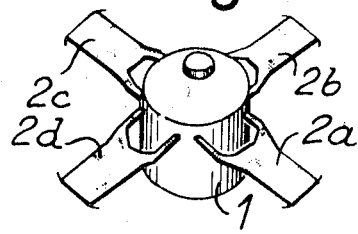
FIG. 4 shows correspondingly the satellite and its solar panels after the latter have been turned into their operative position and latched therein.

As shown in FIG. 2, the panels 2a to 2d are beginning to spread open. In FIG. 3, these panels are entering a damping phase before reaching the limit of their travel, while FIG. 4 shows the panels restored to their ultimate positions, in which they are preferably held immovable by a catch mechanism.

Figure 5:
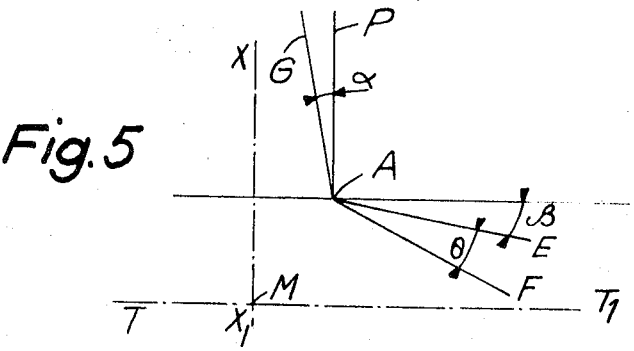
FIG. 5 is a diagram showing the positions of a deployable appurtenance.

Reference is next had to FIG. 5 for a diagram in which the axis $X-X_1$ is the fore/aft or roll axis of the satellite 1 passing through the center of gravity M thereof and A is a hinge for enabling a panel to move from its folded position shown by the line G which is turned inwardly through an angle $\alpha$ with respect to the line P parallel to axis $X-X_1$, to an end-of-travel position F deviating by an angle $\theta$ from a steady latched operative position E which in turn deviates by an angle $\beta$ from a line which is perpendicular to the axis $X-X_1$ and passes through the hinge A, parallel to the pitch axis $T-T_1$ which likewise passes through the center of gravity M.

It is to be noted that the satellite or other spacecraft is capable of rotating about its roll axis and about a pitch axis.

The angle $\alpha$ may be smaller or larger than a zero angle measured with respect to the line AP. Similarly, the angle $\beta$ may be larger or smaller than the zero angle measured with respect to the line passing through the hinge A, parallel to the pitch axis.

The angle $\theta$ is included between zero and a certain maximum value and represents the angular damping travel, which may be selected as a function of the energies in play. This damping effect is designed to absorb energy following dynamic overshoots beyond the deployed operative position of the panels.

In the theory of operation of the articulation device, the actuating function operates from the line AG to the line AE, in rotation about the hinge point A, the damping function from the line AE to the line AF, and the restoring function back to the latched position AE is effected solely in the direction from AF to AE whereas the damping function is effected solely from the line AE to the line AF, with the damping effect becoming null as soon as return motion towards the latched position AE is initiated.

Figure 6:
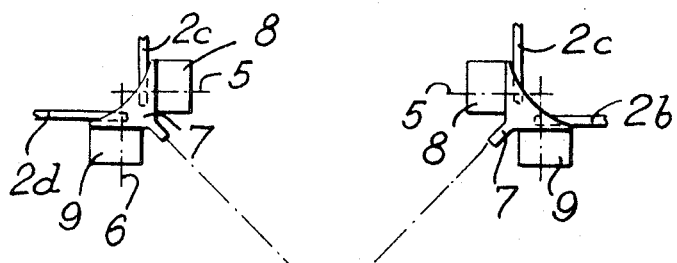
FIG. 6 is a plan view of the distribution about the satellite of the common supporting members for the deployable panels, and the rotation axes of the latter.

As is more clearly shown in FIG. 6, the articulation devices are spaced symmetrically around the satellite, and adjacent appurtenances such as 2c and 2d (shown in FIG. 6 as supporting arms therefor), arranged in pairs, have their hinge axes designated by reference numerals 5 and 6 respectively, with two adjacent appurtenances having their corresponding arms mounted on a common support 7.

Referring still to FIG. 6, it will be seen that the common support 7 includes two articulation devices 8 and 9 mounted on the satellite structure by means of the support 7.

Figure 7:
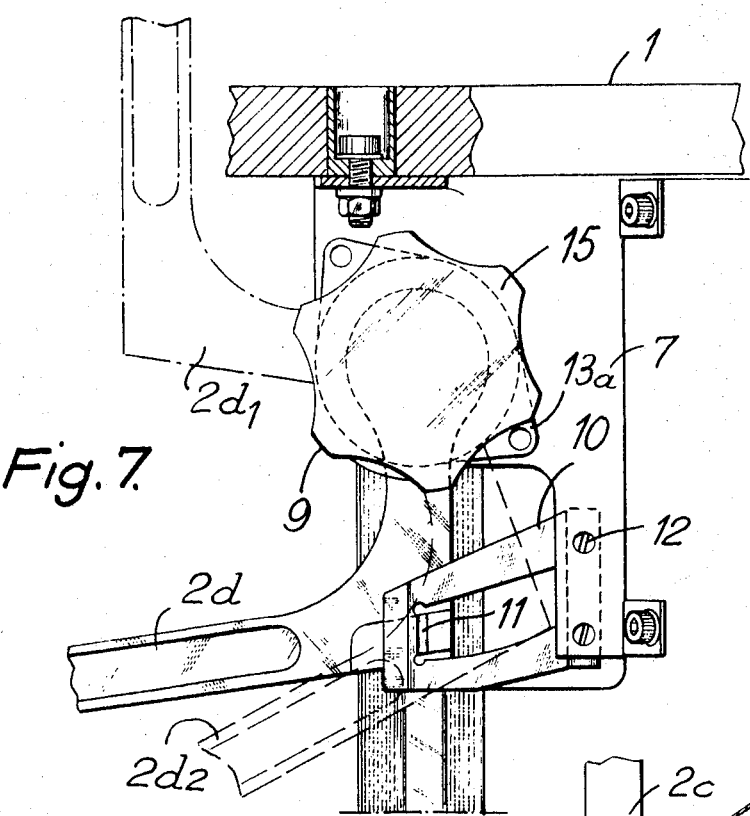
FIG. 7 shows on an enlarged scale and in side elevation an articulation and a panel supporting arm, the latter being shown in solid lines in the latching position, in dot-dash lines in the folded position and in broken lines in the position of limit travel subsequent to damping.
Figure 8:
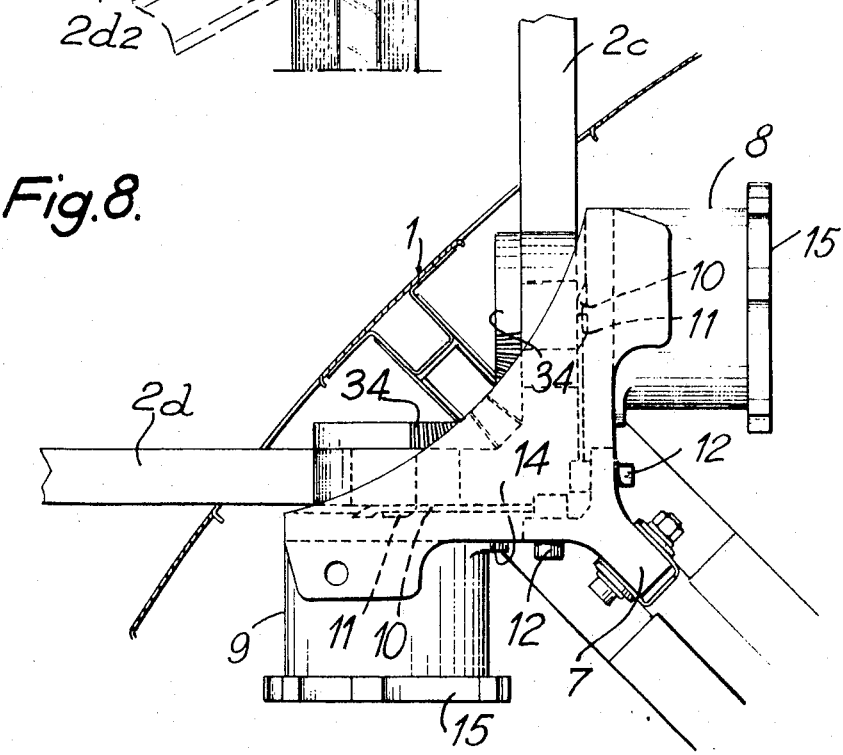
FIG. 8 is a top view corresponding to FIG. 7 of the articulation system shown in the upper left of FIG. 6.

The configuration shown in FIG. 8 portrays panels (such as 2c actuated by the unit 8 and 2d by the unit 9) in their deployed positions, and this disposition is likewise visible in FIG. 7. In FIG. 7 the attachment arm of panel 2d is shown in its three positions, namely in the folded position $2d_1$ portrayed in dot-dash lines, in the stable operative position $2d$ shown in solid lines, and in the limit damping position $2d_2$ shown in broken lines.

In the operative position shown in solid lines, the arm 2d is located in position by a catch mechanism consisting of a stirrup-shaped latch spring 10 mounted on the support 7 and cooperating via its transverse member with an adjustable stop 11 carried by the corresponding arm 2d. The spring 10 is a thin member fixed to support 7 by screws 12, and its stirrup shape imparted by the central opening therein allows the additional damping travel to take place as the adjustable stop 11 passes under said transverse member and then moves back thereagainst for latching therewith.

Figure 9:
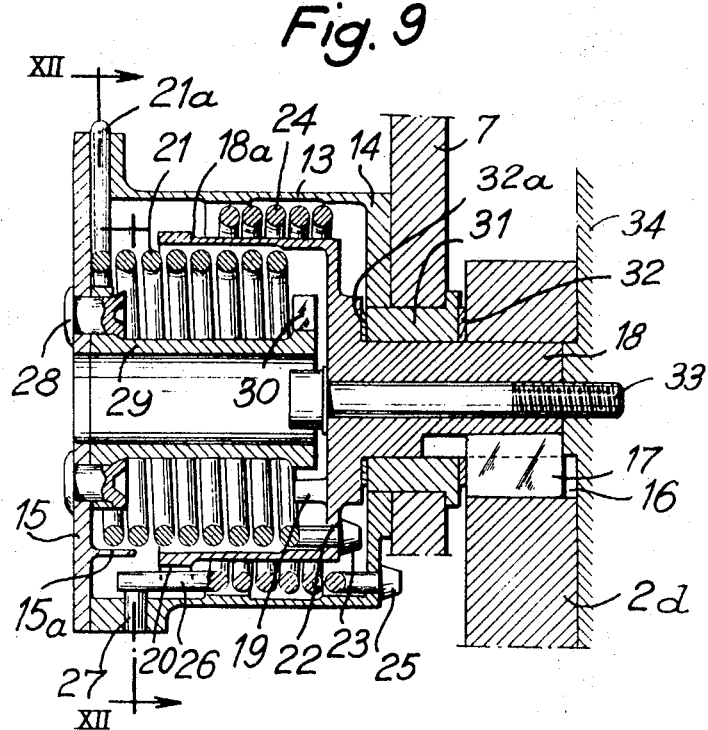
FIG. 9 is a sectional view of the actuating articulation device with its damper means and the means for returning it into the operative position of the panel.

As is more clearly shown in FIG 9, an articulation device 9 is formed by a housing 13 having its base 14 fixed to the common support 7 and its other end closed by a cover 15. This compact housing contains the whole mechanism for deploying appurtenances such as solar panels. Through the agency of a groove 16 and a key 17, the arm 2d supporting such a panel is made angularly rigid with a cylindrical cup-shaped portion 18a the bottom of which is formed with two diametrically opposed internal pegs 19.

Figure 10:
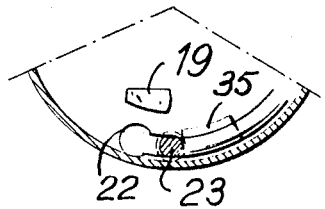
FIG. 10 is a detail view of the manner of securing the actuating spring to the articulation shaft.
Figure 11:
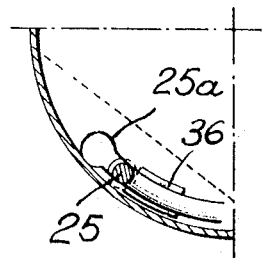
FIG. 11 shows correspondingly a detail of the manner of securing the return spring to the housing.

The cup 18a has a reinforced rim and opens out into the housing 13. The external part of the wall of cup 18a embodies a reinforcement of gradually increasing thickness, the thickest part being joined to the thinnest part by a radial tooth 20. Housed within this cup is an actuating coil spring 21 made of a material of the copper-beryllium-type, for instance, and having one of its ends fixed to the bottom of the cup 18a by means of a restraining member 35 and a buttonhole slot 22 (FIG. 10), of which the wider end allows the reinforced head 23 of spring 21 to pass through and the narrower end restrains said head. The other end of spring 21 forms a radial arm 21a held fixedly captive in a lodging formed between housing 13 and its cover 15. The latter is formed internally with a flange 15a for locating actuating spring 21. Within cup 18a and housing 13, concentrically with spring 21 and pivot 18, is disposed a return coil spring 24 made of a material similar to that referred to precedingly in connection with spring 21 and one of the ends of which is anchored by having its head-shaped tip 25 extend through a buttonhole slot 25a formed in the bottom 14 of housing 13, in conjunction with a restraining member 26, similarly to the way in which the spring 21 is secured to the bottom of cup 18a. The other end 26 of spring 24 is formed as an axial arm which is free to move by cooperating with the abutment tooth 20. In the resting configuration, arm 26 is positioned against a stop peg 27 which is driven into the reinforced wall of housing 13 and is consequently rigid therewith.

Fixed to the inside face of the housing cover 15 by rivets 28, coaxially with the housing 13, is a damper 29 in the form of a cylindrical tube made of a material having great capacity for elongation. The inward end of tube 29 terminates in a base formed with two diametrically opposed lobes 30 capable of acting as stops. These lobes lie within the range of action of the pegs 19. The damper 29, which is rigid with cover 15, is therefore also rigid with the housing 13, which is fixed to common support 7. It forms a fixed member the tubular portion of which deforms torsionally when the pegs 19 act as driving members to transmit a torque through the lobes 30 and thence to the base of tube 29.

Rotation of pivot 18 in the common support 7 is facilitated by an interposed ring 31 which is captive between two washers 32 and 32a made of antifriction material such as that known by the trade name "Teflon," said ring being formed with a thrust flange on one side. The pivot 18 and the assembly just described are retained by the head of a central screw 33 which is screwed into a toothed bevel sector 34 in such manner as to prevent the pivot 18 from shifting axially but to allow it to rotate in the support 7.

As is clearly shown in FIGS. 12 and 13, the housing 13 comprises a base-plate 13a adapted to be fixed to common support 7 by means of screws 13b, the mutual angular location of the bottom 14 and the side of support 7 being ensured by dowels 13c cooperating with matching holes.

Reference to FIG. 12 shows the arrangement of the component parts of the subject device of the present invention, in the configuration in which the appurtenances are folded and in which the actuating spring 21 stores enough energy to rotate the pivot 18 and hence the panel linked to it by virtue of having been initially twisted through 122°, this angle being obtained by rotating the housing itself beforehand counterclockwise through 24° in order to cause the dowels 13c of housing end 14 to cooperate with common support 7 and then securing the base-plate 13a by means of screws 13b, followed by a clockwise rotation through 98° when the panels 2 are folded.

Considering next the return spring 24, the latter is initially twisted through 40° by a counterclockwise rotation of its free end 26, its other end 25 being anchored to the housing, this initial twisting being maintained by engagement of spring end 26 with abutment peg 27.

After the retaining strap 3 has been ruptured, in principle into two parts 4a and 4b, the appurtenances are released and the springs 21 become operative and their ends 23 rotate the pivots 18. Upon reaching the panels-deployed position, pegs 19 contact the lobes 30 of each damper 29, as shown in FIG. 13, and, by virtue of the rotational energy stored by the panels, continue their motion and produced a plastic deformation of the damper involving virtually no restitution of energy.

In the course of this plastic deformation in each housing, however, the return spring 24 undergoes additional twisting as a result of the rotation of pivot 18 which causes the abutment tooth 20 rigid therewith to contact the end 26 of return spring 24. After the position of limit travel has been reached, this additional twisting produces a restoring torque by the spring 24 that causes pivot 18 to rotate clockwise (in the case of the assembly designated by reference numeral 9 in FIG. 7), thereby shifting the corresponding appurtenance or solar panel into its operative position in which it is latched by spring-stirrup 10 and latch 11. By design, the latching is caused to take place in an angular position of 2° before the end 26 of spring 24 abuts against peg 27, thus providing a latching safety margin.

It goes without saying that many changes and substitutions of parts may be made to the specific forms of embodiment described hereinabove without departing from the scope of the invention. Thus, with specific reference to the devising of the damper, the action of which is based on a preferably permanent plastic deformation, recourse could be had as shown in FIG. 14 to a pivot 18b carrying two radial nipples 18c and spigoted into a socket 29a formed with recesses 29b for snugly receiving said nipples 18c. In the course of their rotation, the latter stave in the sidewalls of the recesses 29b, as shown at 29c in FIG. 15, and these staved-in recesses permit unrestrained return motion of the pivot 18b towards an operative position corresponding to a latching of the solar panels or other spacecraft appurtenances to which it is rigidly connected.

Alternatively, as shown in FIG. 16, a pivot 18d could be provided with axial tangs 18e capable of cooperating with a disc 29d rigid with a support 29e and embodying arcuate slots 29f which, as a result of the damping process, would be extended as at 29g. Manifestly also, appurtenances other than solar panels could be adapted for deployment on an artificial satellite or other spacecraft.

We claim:

1. In an articulation device for governing and activating the deployment from a folded position to an operative position of at least one movable appurtenance associated with a spacecraft and more particularly with an artificial satellite, in combination, an articulation support rigid with said spacecraft, an articulation shaft rotatably mounted therein and, interposed between said shaft and said support, first deployment activating means, unidirectional damping means of the rotation of said shaft in said support having limited action over a range just short of a position of limit travel of said appurtenance, and second return motion activating means operative in the direction opposite to said first activating means over a range bounded by said position of limit travel and a substantially intermediate latched operative position of said appurtenance.

2. In a device as claimed in claim 1, wherein said first deployment motion activating means and second return motion activating means are formed by coaxial coil springs mounted in prestressed condition in a housing rigid with said support and enclosing said shaft member.

3. In a device as claimed in claim 2, a first deployment activating spring rigid with said shaft member and with said housing, a second return motion spring having one end fast with said housing and its other end bearing against a stop member rigid with said housing, and a drive member fast with said shaft member and so positioned that its path intersects said other end.

4. In a device as claimed in claim 1, wherein said damping means comprises an element capable of permanent plastic deformation in the direction of motion of said movable appurtenance up to a position of limit travel, the return motion therefrom up to the operative position of said movable appurtenance taking place unrestrainedly.

5. In a device as claimed in claim 4, wherein said damping means further comprises a tube coaxial with said shaft member and having two ends of which one is fast with a housing surrounding said shaft and the other has abutment members thereon, and driving members rigid with said shaft and adapted to move along a path which intersects said abutment members whereby to apply a torsional moment to said tube in one direction only.

6. In a device as claimed in claim 1, an adjustable stop member rigid with said movable appurtenance, and a spring-loaded catch member rigid with said support that is operative in the latching direction whereby to lock said appurtenance in its deployed operative position.

7. In a device as claimed in claim 1, synchronizing means rigid with said shaft member and cooperating with companion means comprised in an adjacent support-and-shaft-member assembly associated to another deployable appurtenance.

8. In a device as claimed in claim 7, synchronizing means formed by a toothed bevel sector.